United States Patent [19]

Lipp

[11] 3,792,454

[45] Feb. 12, 1974

[54] MAGNETIC STORAGE SYSTEM USING ALTERNATE CODES TO REDUCE WRITE CURRENT BIAS

[75] Inventor: James P. Lipp, Oklahoma City, Okla.

[73] Assignee: Honeywell Information Systems Inc., Waltham, Mass.

[22] Filed: Jan. 3, 1972

[21] Appl. No.: 215,978

[52] U.S. Cl. .................. 340/174.1 G, 340/146.3 C

[51] Int. Cl. ......................... G06f 15/34, G06g 7/19

[58] Field of Search ............. 340/174.1 G, 146.3 C; 235/61.11 D

[56] References Cited

UNITED STATES PATENTS 3,609,684 9/1971 Lipp ........................... 340/146.3 C 3,653,036 3/1972 Whiting ....................... 340/174.1 G

*Primary Examiner*—Vincent R. Canney

*Attorney*—Fred Jacob et al.

[57] ABSTRACT

A magnetic storage system which reduces the DC bias of magnetic write current by using alternate codes to represent certain triplets of binary signals where one of those triplets sequentially follows certain occurrences of a control triplet of binary signals. The DC bias required to write an alternate code is either zero or of a polarity which offsets the DC bias required to write the code representing the control triplet.

12 Claims, No Drawings

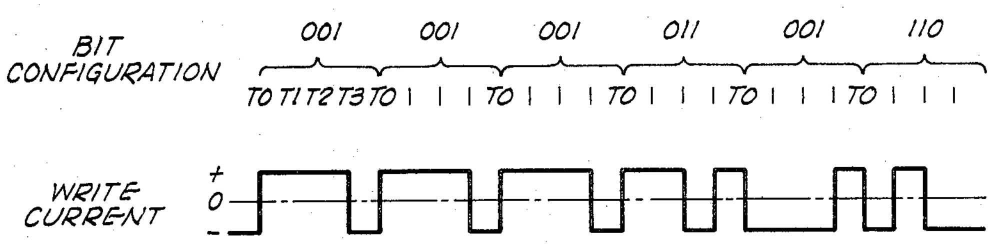
PRIOR ART FIG. 3
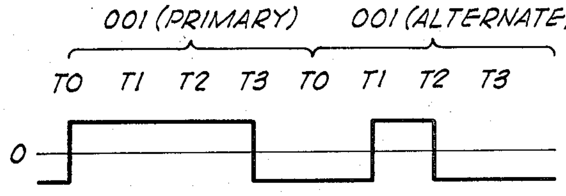
FIG. 4A
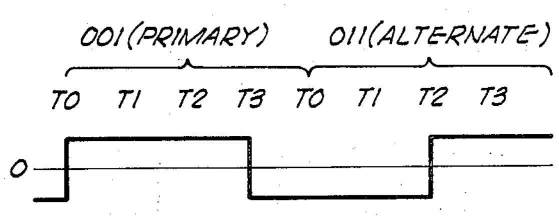
FIG. 4B
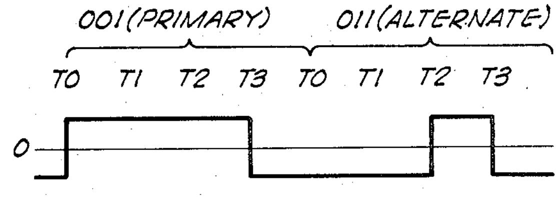
FIG. 4C
FIG. 4
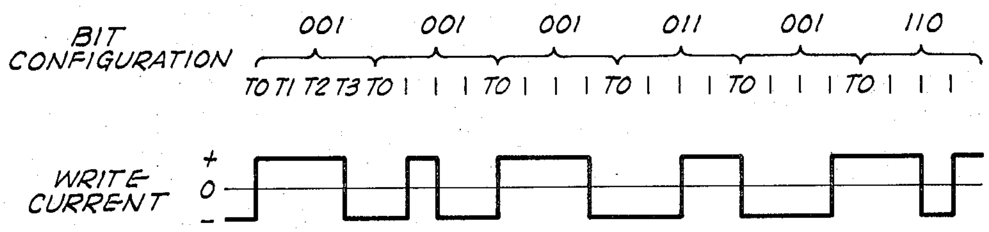
FIG. 5

MAGNETIC STORAGE SYSTEM USING ALTERNATE CODES TO REDUCE WRITE CURRENT BIAS

BACKGROUND OF THE INVENTION

The present invention relates to the storage and retrieval of information and more particularly to methods and apparatus for reducing the direct current bias of write current applied to a magnetic recording head.

Digital information can be stored in a storage medium having a magnetic surface in the form of patterns of magnetic polarity changes or flux reversals within discrete areas (or cells) on the surface of the storage medium. In conventional information storage devices, electromagnetic transducers which establish the flux reversals are individually fabricated from precisely made, discrete components. Each transducer is individually assembled and the manufacturingost per transducer is high. Moreover, there are minimum limits on the size of individually fabricated transducers since an assembler can work only with component parts larger than a certain minimum size.

because of the cost and size limitations of transducers made from discrete parts, depoited film-type transducers have been developed. Such transducers are fabricated in batches by depositing progressive layers of conductive and semiconductive materials on a silicon substrate and by photoetching the deposited layers to form individual transducers. Because the deposition and photoetching processes can be precisely controlled, the individual transducers may be very closely spaced, making it possible to reduce the distances between adjacent tracks of recorded data without interleaving groups of transducers, which would be standard practice for reducing inter!-track spacing of conventional transducers. Deposited film-type transducers have advantages other than their smaller size. Because the fabrication process is a batch process in which many transducers are simultaneously formed, the manufacturing costs per transducer and the manufacturing rejection rate are potentially lower than they are for conventional transducers. In addition, the dimensions of the transducer structure permit recording and reading of data at higher frequencies than are possible with conventional transducers.

Known deposited film-type transducers are single turn magnetic structures, however, which require high write currents while providing low read voltage signals. For this reason, it is an accepted practice to use transformer coupling between deposited film-type transducers and encoder/decoder circuits.

Conventional codes were developed for usw with information storage devices in which theree is no transformer coupling. For certain sequences of data, the write current for commonly used codes may have a significant DC component or bias. Since the incremental inductance of a transformer is altered by a DC bias, the use of such codes with a transformer-coupled transducer may result in a write current which fails to correspond to the transformer input and fails to saturate the recording medium. Saturation of the recording medium can be ensured by using a high transformer input current. However, this may not be practical (1) because the increased current will tend to more severly saturate the transformer core, and (2) because deposited film-type transducers can be operated only within certain current limits. If those current limits are exceeded, thermal deterioration or destruction can occur.

SUMMARY OF THE INVENTION

To overcome the problems attendant to the use of a coupling transformer with a transducer, an information storage system was invented which includes a control means for detecting a control group of data signal a appearing at the output of a data signal source. The control means responds to any occurrence of the control group other than an even-numbered occurrence in a series of repeated occurrences to generate an encoder control signal. The encoder contorol signal is effective during the recording of the patterns representing the succeeding group of data signals. The system further r includes encoder means connected to the data source and the control means. The encoder means is adapted to generate at least one primary pattern of recording signals for each unique group of data signals but is further adapted to generate alternate patterns of recording signals for certain groups of data signals. In the absence of an encoder control signal, the encoder generates the primary patterns for successive groups of applied signals. In the presence of an encoder control signal, the encoder generates the alternate pattern for any applied group having such a patterns. The patterns of recording signals are applied to recording means connected to the encoder means. The recording means converts each generated patterns to a readable form which is stored in a single cell in a track on the surface of a recording medium.

DESCRIPTION OF THE DRAWINGS

While the specification concludes with claims particularly pointing out and distinctly claiming that which is regared as the present invention, details of a particular embodiment of the invention along with its further robjects and advantages may be more readily ascertained from the following detailed description when read in conjunction with the accompanying drawings wherein:

FIG. 3 depicts the write current waveforms whoich would be used to record representations of a preselected sequence of binary signals if prior art coding philosophies were to be used;

FIG. 4 shows the relaionship between primary and alternate write current waveforms representing certain configurations of binary signals;

FIG. 5 shows the write current waveforms would be generated in writing representations of the binary signals shown in FIG. 3, using a code established according to the present invention rather than according to a prior art philosophy;

DETAILED DESCRIPTION

Figure 1:
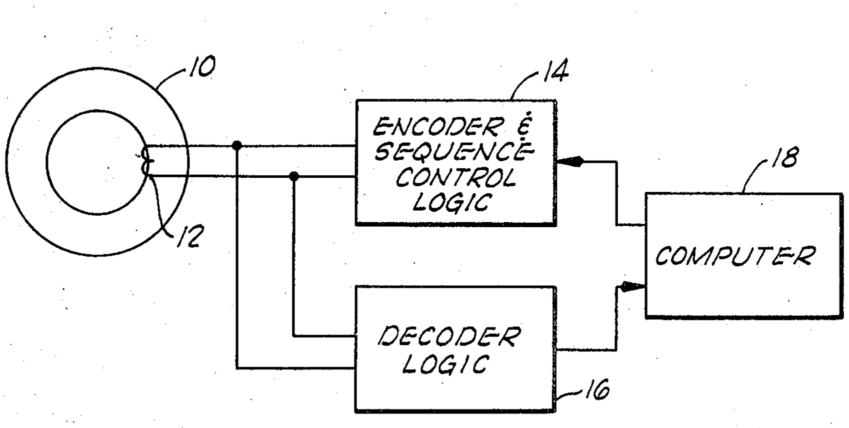
FIG. 1 is a generalized block diagram of an information storage system constructed in accordance with the present invention.

The present invention is described in the context of a disc memory unit wherein representations of binary information are recorded on concentric circular tracks on the surface of a disc 10 shown in FIG. 1. An electromagnetic transducer 12 is used both to record flux reversals under the direction of encoder and sequence control logic 14 and to detect flux reversals for use by decoder logic 16. Both encoder and sequence control logic 14 and decoder logic 16 are ultimately under the control of a computer 18. Details of the type of logic circuits required for encoder and sequence control logic 14 and decoder logic 16 are described in detail later. The function of the encoder and sequence control logic 14 is to accpet triplets of binary digits from computer 18 or from any other source of data signals and to convert those triplets to write current waveforms which establish flux reversal patterns on the surface of the disc 10.

In the particular embodiment of the invention described below, magnetic representations of successive triplets of binary digits are recorded in successive cells in a track on the recording medium. Each magnetic representation consists of a pattern of flux reversals occuring in at least two of four transition positions, to T1, T2, T3 within each cell. While different patterns of flux reversals are associated with different triplets of binary digits, each pattern used in a system incorporating the present invention is characterized by the fact that it has no more than two consecutive transition positions in which a flux reversal does not occur.

Figure 2:
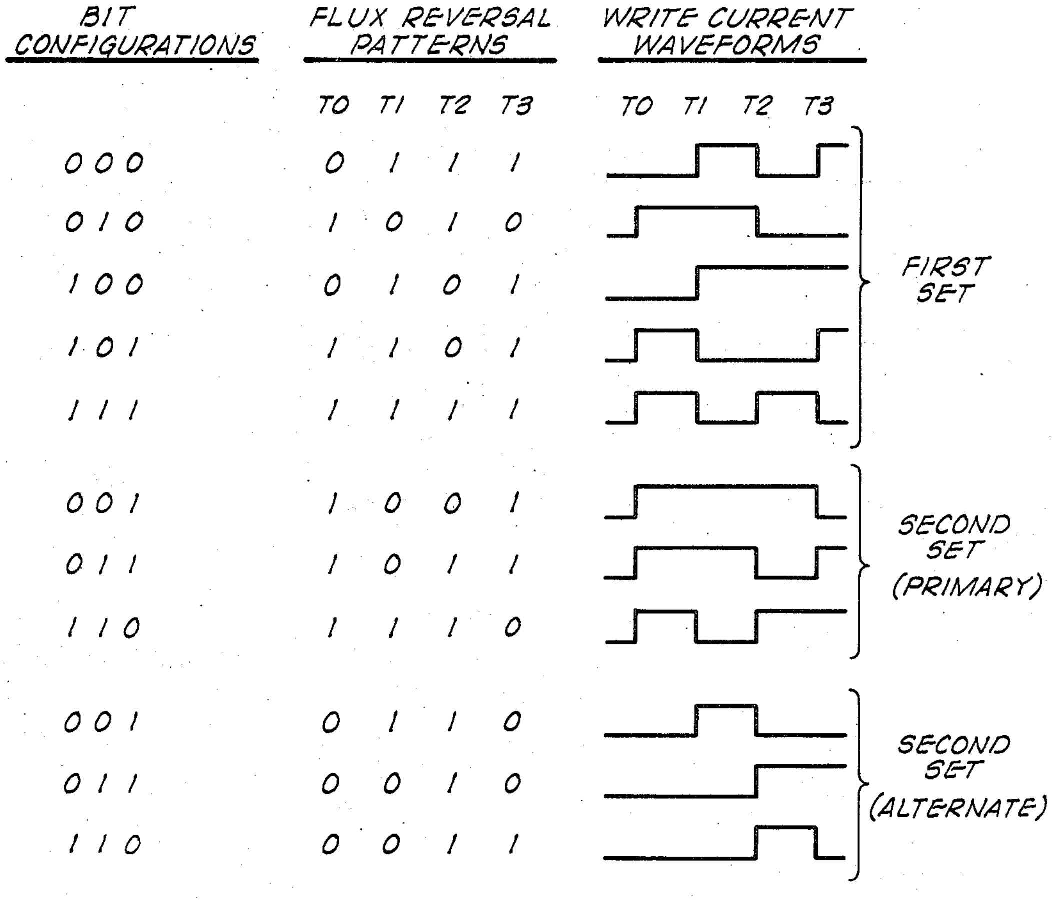
FIG. 2 is a chart showing the correspondence between the configurations of triplets of binary digits, flux reversal patterns, and write current waveforms.

The write current waveforms and flux reversal patterns corresponding to different triplets of binary digits are shown in Fig. 2. In that figure, it will be seen that the triplets of binary digits 000, 010, 100, 101 and 111, designated as a first set of triplets, are represented by a single write current waveform and a single flux reversal pattern. That is, each different triplet in the first set of triplets is represented by only one flux reversal pattern. The write current polarities are arbitrarily selected. The actual polarities may be reversed.

FIG. 2 also shows a second set of triplets of binary digits (101, 011 and 110) each of which in accordance with the present invention may be represented by either a primary or an alternate flux reversal pattern. For example, the triplet 001 may be represented by a primary flux reversal pattern having flux reversalst at position T0 and T3 within a cell or by an alternate flux reversal pattern having flux reversals at positions T1 and T2 within the cell. Similarly, the triplet 011 may be represented by a primary flux reversal pattern wherein flux reversals are established at postionst to T2 and T3 or by an alternate flux reversal pattern wherein a single flux reversal is established at position T2 within a cell. The triplet 110 may be represented by a primary flux reversal pattern having flux reversals at positions to T1, T2 or by an alternate pattern having flux reversals at positions T2 and T3.

To illustrate an advantage of the present invention, reference is made to prior art coding techniques wherein a single flux reversal pattern represents each different triplet of binary digits. For purposes of illustration, assume that the prior art code is the code shown in FIG. 2 but without the alternate flux reversal patterns for the binary triplets 001, 011, 110. In other words, the hypothetical prior art code is represented by the eight primary patterns shown in FIG. 2. If certain sequences of triplets are recorded using only the primary patterns, the required write current contains a considerable DC bias simply by virtue of the fact that the write current is one polarity for a considerably longer period of time that it is of the opposite polarity. This situation is illustrated in FIG. 3 wherein triplets of binary digits are recorded in the following sequence: 001 001 001 001 011 001 110. The write current required to recorded the primary flux reversal patterns for this sequence of triplets has a high positive bias. If the write current between successive transition positions is regarded as a unit of write current (disregarding its actual value in amperes) recordation of the specified sequence requires 14 units of positive write current and only 10 units of negative write current. Under these conditions, the positive direct current bias which exists tends to partially saturate the magnetic core structure of the transformer used to drive the recording transducer.

The present invention reduces the direct current bias by using alternate flux reversal patterns for the triplets 001, 011, 110, where any one of those triplets is to be recorded immediately after certain occurrences of the triplet 001. The triplet 001 is referred to as a control triplet or control group. As was mentioned with reference t FIG. 2, the primary flux reversal pattern for this triplet is generated by a write current which goes to one polarity at position T0 in a cell and continues to have the same polarity until position T3. The alternate patterns of flux reversals for the specified triplets are selected from a group of patterns generated by write currents having either no DC bias or a DC bias which offsets the DC bias established by the write current for the primary pattern for the control triplet 001. That is, when the write current for the primary pattern for the control triplet is positively biased, the write currents for the alternate patterns are neutral or negatively biased. This may be seen in FIG. 4, consisting of write current waveforms 4A, 4B and 4C. FIG. 4A shows the write current waveforms required to generate the primary and the alternate patterns for successive occurrences of triplet 001. Assuming the write current waveform above the zero line is positive, four units of positive write current and four units of negative write current are required to record flux reversal patterns for the sequence 001 001. Thus, the positive direct current bias required to write the primary pattern is cancelled by the negative direct current bias required to write the alternate pattern.

Similarly, FIG. 4B shows that five units of positive write current and three units of negative write current are required to write the primary pattern for the control triplet 001 in sequence with the alternate pattern for the triplet 011. While the positive direct current bias is not completely eliminated in this sequence of data, it is reduced relative to the bias required to write the primary patterns for the triplet 001 011. Referring to waveform 4C, the four units of positive write current required to write the primary pattern for the group 001 in sequence with the alternate pattern for the triplet 110 are offset by the four units of negative current also required.

The use of alternate patterns for triplets 001, 011, and 110 in the enven numbered cells in the sequence 001 001 001 011 001 110 is shown in FIG. 5. While the sequences of binary triplets shown in FIGS. 3 and 5 are the same, the write current waveforms differ considerably due to the use of alternate patterns in FIG. 5 in place of certain primary patterns in FIG. 3. Thirteen units of positive write current and eleven units of negative write current are required for the primary and alternate patterns of FIG. 5. While the direct current bias required to write the primary and alternate patterns is not eliminated, it is reduced.

Figure 6:
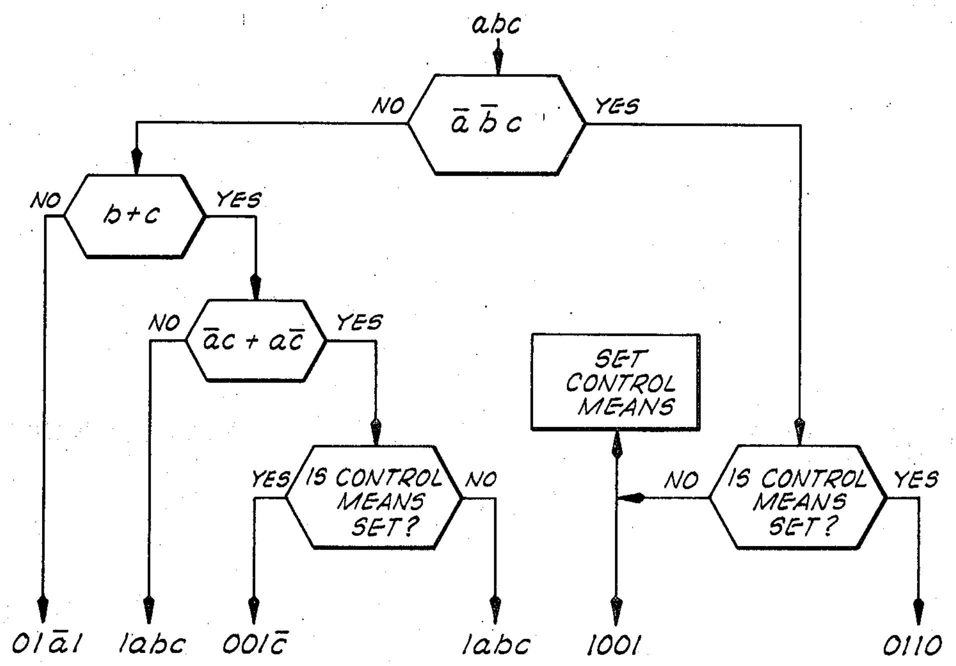
FIG. 6 is a flow chart used in explaining the encoding and sequence control techniques of the present invention.

A flow chart of the encoding and sequence control logic which might be used to insure that the alternate patterns are written in at the appropriate places in the recording sequence is shown in FIG. 6. Using the letters *a, b, c* to represent the triplet of binary digits to be recorded, the first step in the logic process is to determine whether the triplet is the control triplet 001. If the binary digit corresponding to a and the binary digit corresponding to *b* are zero while the digit corresponding to *c* is a 1, the next triplet to be recorded is the control triplet. Under these conditions, the next step is to determine whether the last pattern recorded was the primary pattern for the control triplet. If the last pattern recorded was the primary pattern, signals establishing the flux reversal pattern 0110 are generated. If the last pattern recorded was not the primary pattern for the control triplet, the flux reversal pattern 1001 is recorded and sequence control logic is set to indicate that the primary pattern for the control triplet is being recorded.

If it is determined that the triplet being recorded is not the control triplet, it is then determined whether either the b bit or the *c* bit is one. If neither of these bits is one, the flux reversal pattern takes the form 01*a*1 where, in accordance with convention *a* is 0 if a is 1 or a is 1 if a is 0. Ifither the *b* or the *c* bit is one, another decision is required. This decision is whether a is zero and *c* is one or a is one ad *c* is zero. If neither of these conditions is true, the flux reversal pattern takes the form 1*abc*. If either of the conditions is true, it must be determined whether the primary pattern for the control triplet was the last pattern recorded. If the primary pattern for the control triplet was the last pattern recorded. If the primary pattern for the control triplet was the last pattern recorded, the flux reversal pattern for the triplet now being recorded takes the form 001*c*. If the last pattern recorded was not the primary pattern for the control triplet, the flux reversal pattern takes the form *a*

Figure 7:
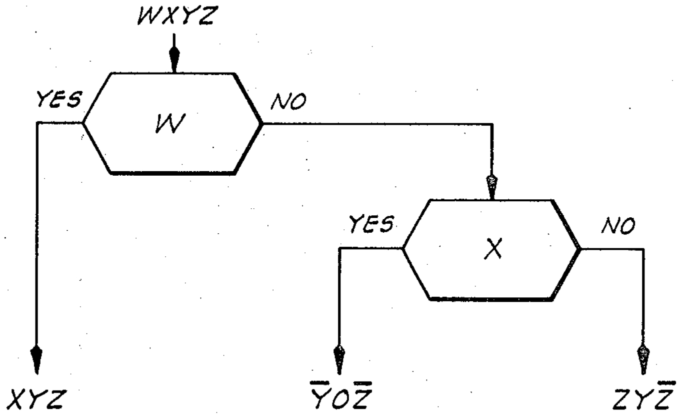
FIG. 7 is a flow chart illustrating the decoding logic which might be used in a system constructed in accordance with the present invention.

The flow chart showing the decoder logic required to interpret the flux reversal patterns is shown in FIG. 7. The decorder logic must be capable of interpreting the primary and the alternate pattern for the triplets in the second set as representing the same triplet. The logic required to accomplish the decoding function has two decision steps. The first decision is whether a flux reversal occurred at the first transition position of the cell. The transition positions to T1, T2 and T3 are represented by the letters W, X, Y and Z respectively. If a flux reversal was recorded at the first transition position W, the binary tripl1t recorded is determined simply by looking for the presences or absences of flux reversals at the remaining three transition positions X, Y and Z, considered in that order. The presence of a flux reversal is interpreted as a binary 1. The absence of a reversal is interpreted as a binary 0.

If it is determined in the first step of the two step decoding processing that no flux reversal occurred at transition position W, the second decision which must be made is whether a flux reversal occurred at the second transition position X. If a flux reversal did occur at position X, the triplet of binary digits is taken to be YOZ.AThe presence of a flux reversal at transition positions Y or Z is interpreted as a binary zero. Correspondingly the absence of a flux reversal is interpreted as a binary 1.

If it is determuined that neither of the first two transition positions contains a flux reversal, the representative triplet of binary digits is represented by the form ZYZ. According to this form, the first and second binary digits are established by interpreting the presence of a flux reversal at the Z and Y transition positions respectively as binary 1's while the third binary digit is established by interpreting the absence of a flux reversal at transition position Z as a binary 1.

Figure 8:
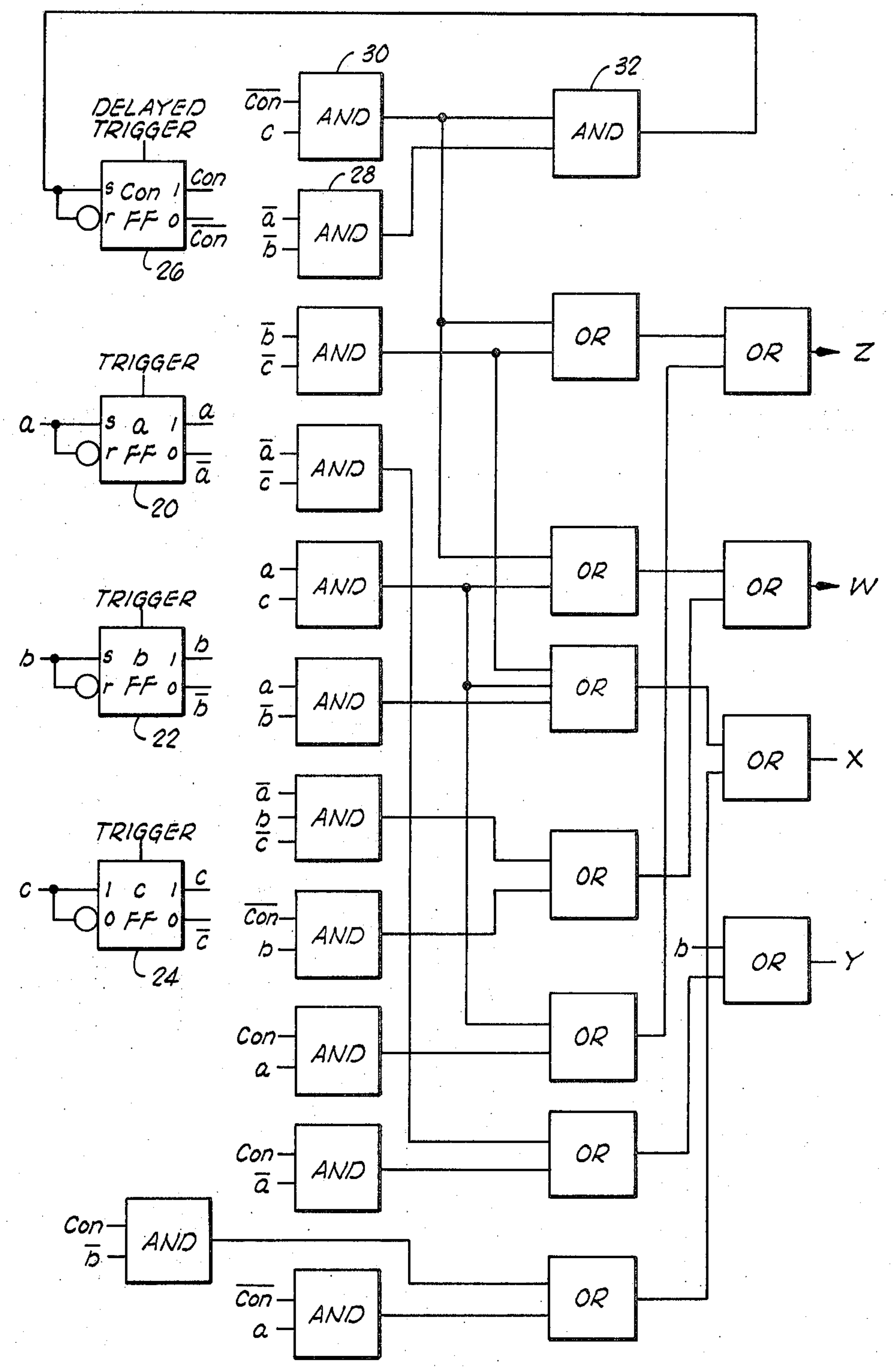
FIG. 8 is a schematic of the encoder and sequence control logic which might be used in implementing the present invention.

The encoder and sequence control logic shown in flow chart form in FIGL 6 can be implemented through the use of logic elements shown in FIG. 8. Each of the binary digits in a triplet is applied in normal form to the set terminal and in inverted form to the reset terminal of one of three flip-flops 20, 22, 24 having normal or 1 and inverted or 0 outputs. If the binary digit is a 1, the flip-flop to which it is applied is set upon application of a trigger pulse. In its set state, the normal output of the flip-flop carries a "1" signal, normally a high level voltage, whereas the inverted output carries a "0" or low level signal. Each output of each of the dat a flip-flops is connected to at least one of a plurality of AND gates which perform the logical function of ANDing output signals from the data flip-flops 20, 22, 24 and from a control flip-flop 26. The outputs of most of the AND gates are paired and logically combined in OR gates to derive signals representing the presence or absence of flux reversals at the transition positions W, X, Y, Z.

The state e of the control flip-flop 26 is not a function of the configuration of the triplet of binary signals currently being recorded but rather is a function of the configuration of the triplet recorded in the preceding cell and of its own state following the recordation in the preceding cell. If the outputs of AND gates 28 and 30 indicate that the prior triplet or binary digits was the control triplet 001 and furthejrindicate that the control flip-flop was in its reset state during the recording of that triplet, AND gate 32 generates a logic 1 signal on its control output. This logic 1 signal is fed back to the set input of the control flip-flop 26 in normal form and to reset input in inverted form. Flip-flop 26 does not change state during the recording of current data but rather changes state after data has been recorded or upon the application of a delayed trigger signal to the flip-flop 26. The delayed trigger signal occurs near the end of the recording cycle for each cell and causes the-flip-flop to assume a state which may alter the pattern recorded in the next cell. If thiprimary pattern for the control triplet was the prior pattern recorded and if the subsequen t triplet is a striplet in the second set, the control flip-flop 26 sets and the alternate pattern for the subsequent triplet is recorded. The signals generated by flip-flop 26 in its set state are the encoder control signals referred to earlier.

While a particular embodiment of the invention has been described, it should be understood that variations and modifications will occur to those skilled in the art. For example, although the invention was developed for use with deposited film-type transducers, it can obviously be used with conventional transducers. Moreover, the invention could be implemented through the use of read only memories rather than conventional logic elements. Since these variations and other would be obvious to those skilled in the art, it is intended that the appended claims shall be construed as covering all such variations and modifications as fall within the true spirit and scope of the invention.

I claim:

1. For use with a data signal source, an information storage system for storing successive patterns representing successive groups of the data signals in successive cells in a track on a recording medium, said system including:

a. a control means for detecting a control group of data signals at the output of the data signal source, said control means being responsive to any occurrence of the control group other than even-numbered occurrences in a series of repeated occurrences to generate an encoder control signal effective during the recording of the succeeding group of data signals;

b. encoder means connected to the data signal source and to said control means, said encoder means being adapted to generate a unique primary pattern of recording signals identifyinveach unique group of data signals in a first set of such signals and to generate both a unique primary pattern and a unique alternate pattern of recording signals independently identifying each unique group of data signals in a second set of such signals, said encoder means being responsive in the absence of an encoder control signal to generate the primary pattern for any applied group in either the first or the second set, said encoder means being further responsive during the existence of an encoder control signal to generate the alternate pattern for any applied group in the second set and the primary pattern for any applied group in the first set; and c. recording means connected to said encoder means for converting each generated pattern to a readable form stored in a single cell in the track.

2. An information storage system as recited in claim 1 wherein the primary and alternate patterns may be balanced, negatively biased or positively biased and the bias of a recorded alternate pattern either is zero or offsets the bias of the previously recorded primary pattern identifying the control group.

3. An information storage system as recited in claim 2 wherein the primary and alternate patterns consist of signals having a zero value or non-zero values, the non!-zero values being positive or negative.

4. An information storage system as recited in claim 2 wherein the bias of each alternate pattern identifying a unique pgroup of data signals is either zero or opposite the bias of each primary pattern identifying the same unique group.

5. An information storage system as recited in claim 3 wherein the bias of each alternate pattern identifying aunique group of data signals is either zero or opposite the bias of each primary pattern identifying the same unique group.

6. An information storage system as recited in claim 3 wherein each pattern has a maximum of two successive zero signals.

7. An information storage system as recited in claim 6 wherein said recording means comprises a magnetic recording head for establishing magnetized regions on the recording medium.

8. An information storage system as recited in claim 7 wherein the readable form established by said recording means comprises a pattern of magnetic flux reversals or the absences thereof occurring at a predetermined number of positions within a cell.

9. An information storage system as recited in claim 8 further including means for reading the magnetic flux reversals to identify each unique group of data signals from the recorded pattern of flux reversals, said reading means being adapted to interpret a primary and corresponding alternate pattern as identifying the same unique group of data.

10. A low bias method of recording magnetic representations of groups of binary signals in successive cells in a track on a magnetizable recording medium including the steps of:

a. selecting a primary magnetic pattern to represent each different group of binary signals in a first set and a primary magnetic pattern and a corresponding alternate magnetic pattern to represent each different group of binary signals in a second set;

b. monitoring the groups of binary signals to be represented to detect a control group having a particular bit configuration;

c. generating a control signal upon each occurrence of the control group other than any eneven-numbered occurrence in a series of repeated occurrences;

d. recording the primary pattern for any group of binary signals in the absence of a control signal or the primary pattern for any group in the first set and the alternate pattern for any group in the second set in the presence of a control signal.

. A low bias method as recited in claim 10 including the additional step of selecting the alternate patterns om a group of patterns having either no bias or a bias opposite the bias of the primary pattern for the control group.

12. A low bias method as recited in claim 10 including the additional step of selecting the alternate patterns from a group of patterns having either no bias or a bias opposite the bias of the primary patterns in the second set.

* * * * *